(12) United States Patent
Lin et al.

(10) Patent No.: US 12,041,642 B2
(45) Date of Patent: Jul. 16, 2024

(54) USER EQUIPMENT AND METHOD OF WIRELESS COMMUNICATION OF SAME

(71) Applicant: GUANGDONG OPPO MOBILE TELECOMMUNICATIONS CORP., LTD., Dongguan (CN)

(72) Inventors: Huei-Ming Lin, South Yarra (AU); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 364 days.

(21) Appl. No.: 17/547,661

(22) Filed: Dec. 10, 2021

(65) Prior Publication Data

US 2022/0104203 A1 Mar. 31, 2022

Related U.S. Application Data

(63) Continuation of application No. PCT/CN2019/100748, filed on Aug. 15, 2019.

(51) Int. Cl.
  H04W 72/53 (2023.01)
  H04L 5/00 (2006.01)
  H04W 72/044 (2023.01)
  H04W 72/20 (2023.01)

(52) U.S. Cl.
  CPC .......... H04W 72/53 (2023.01); H04L 5/0051 (2013.01); H04W 72/0473 (2013.01); H04W 72/20 (2023.01)

(58) Field of Classification Search
  None
  See application file for complete search history.

(56) References Cited

U.S. PATENT DOCUMENTS

2020/0322095 A1\* 10/2020 Park ................. H04L 1/1893

FOREIGN PATENT DOCUMENTS

| CN | 101494477 A | 7/2009 |
| EP | 1684444 A2 | 7/2006 |
| WO | 2015168917 A1 | 11/2015 |

OTHER PUBLICATIONS

3GPP TSG RAN WG1 #97, Discussion on PHY procedures for sidelink, May 13-17, 2019_R1-1906469 (Year: 2019).\*
International Search Report and the Written Opinion Dated May 13, 2020 From the International Searching Authority Re. Application No. PCT/CN2019/100748, 9 pages.
ZTE et al., "Discussion on PHY procedures for sidelink", 3GPP TSG RAN WG1 #97 R1-1906469, May 17, 2019, 6 pages.
LG Electronics, "Discussion on physical layer procedures for NR sidelink", 3GPP TSG RAN WG1 Meeting #97 R1-1907018, May 17, 2019, 11 pages.

\* cited by examiner

*Primary Examiner* — Yemane Mesfin
*Assistant Examiner* — Jeff Banthrongsack
(74) *Attorney, Agent, or Firm* — BAYES PLLC

(57) ABSTRACT

A user equipment and a method of wireless communication of same are provided. The method includes representing a transmit (Tx) power for the user equipment, wherein the representation of the Tx power for the user equipment provides a division of a range of output power for the user equipment into different granular scales of power information.

16 Claims, 5 Drawing Sheets

500

502 Obtaining a representation of a transmit (Tx) power for the user equipment by a network configuration, a pre-configuration to the user equipment, or a pre-store in the user equipment according to a pre-defined rule, wherein the representation of the Tx power for the user equipment provides a division of a range of output power for the user equipment into different granular scales of power information 504 Indicating, to another user equipment, the Tx power for the user equipment in two separate components using a two-part indication

USER EQUIPMENT AND METHOD OF WIRELESS COMMUNICATION OF SAME

CROSS REFERENCE TO RELATED APPLICATION

This application is a continuation of International Application No. PCT/CN2019/100748, filed Aug. 15, 2019. The application is incorporated herein by reference in their entireties.

BACKGROUND OF DISCLOSURE

1. Field of the Disclosure

The present disclosure relates to the field of communication systems, and more particularly, to a user equipment and a method of wireless communication of same.

2. Description of the Related Art

Sidelink (SL) technologies developed under 3rd generation partnership project (3GPP) for device-to-device (D2D) wireless communication directly from one user equipment (UE) to another UE have been traditionally designed to provide mission critical communication for public safety (PS) services and vehicle-to-everything (V2X) communication for intelligent transportation system (ITS) including road safety use cases.

Under those applications and services, an important objective is to provide a reliable sidelink (SL) communication system since the safety of PS personnel and road users such as drivers, riders, and pedestrians are on the line. In order to ensure their safety from providing a reliable D2D system, the design of SL communication has been focusing on broadcast type of transmission/communication in the past and the transmission output power from UE should be as large as possible to reach as far and as wide area as possible.

As the evolution of ITS services are constantly progressing, more advanced V2X use cases such as vehicle platooning, extended sensor data sharing, and autonomous driving are required to be supported in a near future.

In addition, high data rate augmented reality (AR) and virtual reality (VR) gaming and applications are also some of emerging services that 5th generation-new radio (5G-NR) system is aiming to support.

For these new applications and services, SL unicast and groupcast communications are needed and they are often confined within a group of close proximity users and the required transmission power between them would be small to save battery consumption, minimize interference to users outside the group, and increase SL resource reuse factor. However, if the use of new SL unicast and groupcast coexist with broadcast transmissions, based on the existing SL resource sensing and selection procedure, broadcast UEs may wrongly determine unicast/groupcast UEs are far away due to their low transmission power and as such interpret that it is safe to reuse the same SL resource for their own transmissions. As a result, causing transmit (Tx) collisions/interference to the unicast/groupcast session.

Furthermore, based on the existing SL power control (PC) mechanism for a Tx-UE to derive its appropriate transmission output power level, it is required that the Tx-UE to blindly determine its Tx power at first until a SL channel measurement report, i.e., reference signal received power (RSRP) is fed back from a receiver UE (Rx-UE) before SL pathloss can be calculated. Due to this, the applicability of this PC mechanism is only limited to SL unicast communication. If it is extended to SL groupcast communication, the signaling overhead of exchanging channel measurement reports from all Rx-UEs to each Tx-UE will be overwhelmingly significant. Moreover, it also requires individual radio resource control (RRC) connection to be established for every Tx-Rx UE pairs only for the purpose of sending channel measurement feedbacks. It seems overly excessive. Other problems and deficiencies of the existing SL power control mechanism include the followings:

1. Delay in exchanging channel measurement reports from a Rx-UE to the Tx-UE can lead to slow adaptation to fast changing wireless channel conditions/environment. This leads to sub-optimal sidelink communication performance.

2. Inaccurate measurement reports or feedback error can also lead to sub-optimal performance.

3. Without Rx-UE knowing the transmission output power used by the Tx-UE, it is not possible for the Rx-UE to determine an appropriate power level for sending its acknowledgement/negative-acknowledgement (ACK/NACK) and channel measurement feedback information. And therefore, risking of creating interference to other UEs from transmitting excessive output power or not being correctly received by the Tx-UE from transmitting with insufficient output power level.

4. Furthermore, this type of power determination mechanism is also not applicable for connectionless groupcast communication, where no prior radio resource control (RRC) connection can be established and all Rx-UEs feedbacking NACK-only information share the same SL feedback resource, i.e., physical sidelink feedback channel (PSFCH). In this type of feedback scenario, all UEs should appropriately determine their feedback transmission power to avoid any misinterpretation by the Tx-UE and minimizing interference to adjacent PSFCH transmissions.

5. In connectionless groupcast with NACK-only feedback, Rx-UE(s) will likely use maximum transmission power level for sending their NACK information to ensure its reception by the Tx-UE. But when the Rx-UE is very close-by the Tx-UE, NACK reception will appear to be very large even though there may be only one UE is feeding back the NACK-only information. In this case, the Tx-UE may interpret there are multiple UEs who did not receive the original packet transport block (TB) being sent correctly. As such, the Tx-UE may choose to re-send the packet TB again.

SUMMARY

An object of the present disclosure is to propose a user equipment and a method of wireless communication of same capable of providing less signaling message exchange, more applications, use cases, and thus offering greater flexibility.

In a first aspect of the present disclosure, a user equipment for wireless communication includes a memory, a transceiver, and a processor coupled to the memory and the transceiver. The processor is configured to represent a transmit (Tx) power for the user equipment, wherein the representation of the Tx power for the user equipment provides a division of a range of output power for the user equipment into different granular scales of power information.

In a second aspect of the present disclosure, a method of wireless communication of a user equipment includes representing a transmit (Tx) power for the user equipment, wherein the representation of the Tx power for the user equipment provides a division of a range of output power for the user equipment into different granular scales of power information.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
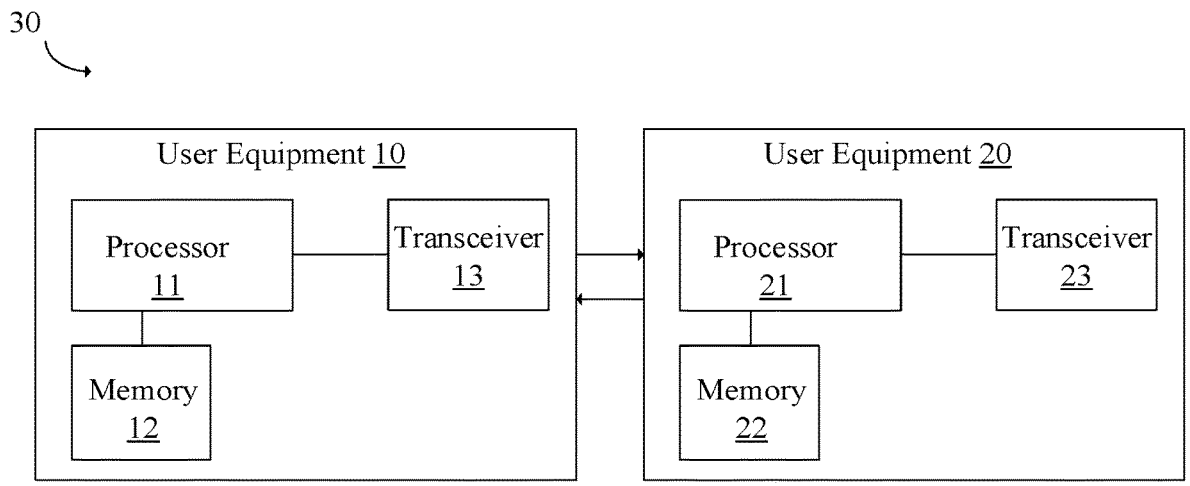
FIG. 1 is a block diagram of a user equipment (UE) for wireless communication and another UE in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Based on the above analysis and identified deficiencies, it is reasonable for a transmit user equipment (Tx-UE) to directly indicate its transmit power level to another UE or other UEs in sidelink communications to avoid interference and to allow receiver UE(s) (Rx-UE(s)) to immediately derive SL pathloss for determining their output powers not only for transmitting a physical sidelink control channel (PSCCH)/a physical sidelink shared channel (PSSCH), but for delivering a physical sidelink feedback channel (PSFCH) as well in both unicast and groupcast sidelink communications. Furthermore, it can also be used during resource sensing procedure to help in selecting appropriate resources to avoid in-band emissions (IBE) interference problem. It can also be used for determining or aiding radio link maintenance, e.g., by knowing the exact Tx power from the Tx-UE and calculating sidelink reference signal received power (SL-RSRP), the Rx-UE will be able to determine whether the existing unicast/groupcast radio link connection can be maintained or not. For example, if Tx power is already at the maximum allowable output level (Pcmax) and the measured RSRP is low, the Rx-UE may determine the radio link connection quality cannot be improved and sends a radio link failure (RLF) status to the Tx-UE. But if the Tx power level is not at the maximum allowable level, the Rx-UE can send direct power control (PC) command to the Tx-UE requesting to increase its transmission output power.

To do this, the straightforward method is to include UE's SL transmit power level as part of the SCI when transmitting physical sidelink control channel (PSCCH). According to the existing RSRP reporting, there are currently 98 values that a UE can use to indicate its measured RSRP levels for feedback. To fully represent all of these values, it will require a SCI parameter of 7 bits. In long term evolution (LTE) SL communication, a SCI format has up to around 40 bits. Adding another 7 bits to the SCI will have significant impact/degradation to the control decoding performance, resulting in reduced reliability and smaller coverage, and hence undesirable.

In some embodiments of the present disclosure, transmit (Tx) power representation and indication methods for a Tx-UE to directly provide a transmit output power thereof over a sidelink interface to one or more receiver UEs, it aims to mitigate the above described deficiency problems as at least one of following advantages.

1. Signaling exchange overhead of feeding back sidelink RSRP measurements from the Rx-UE(s) in order for the Tx-UE to calculate pathloss and determine new Tx power for future transmissions. 2. Sub-optimal sidelink communication performance due to signaling delay, processing time, inaccurate measurement of sidelink RSRP, and feedback errors. 3. Inflexible power control mechanism due to its applicability is only restricted to SL unicast communication.

In some embodiments, in order to achieve these, it is proposed for a Tx-UE to indicate its transmission output power over two parts, and for each of the parts it represents different quantization level/scale of UE's power range while minimizing the indication payload size in each part. By doing so, a UE receiving and successfully decoding both indication parts will be able to obtain the sidelink transmission power used by the Tx-UE without losing any estimation accuracy and subsequently be able directly calculate pathloss for the Tx-Rx link and determine appropriate Tx output power level for sending its data/feedback messages back to the Tx-UE. Alternatively, the pathloss can be taken into account during its resource selection procedure to avoid Tx collision and creating interference.

Benefits of adopting SL transmission power representation and indication methods in some embodiments include at least one of advantages. 1. Support of faster processing and more accurate estimation of Tx power transmitted by the Tx-UE without needing channel measurement feedbacks from the Rx-UEs. 1. Allow immediate determination of suitable/appropriate Tx power for sending feedback reporting and data information from the Rx-UE. 2. Provides a minimal additional information payload to represent sidelink transmission power used by the Tx-UE. The saving of payload size in SCI can be up to half of using the full power representation. 3. Allow flexible use and decoding of Tx power indication over two separate parts to not only save payload size, but also allow to be used in more SL communication scenarios, such as broadcast and connectionless groupcast.

FIG. 1 illustrates that, in some embodiments, a user equipment (UE) 10 for wireless communication and another UE 20 in a communication network system 30 according to an embodiment of the present disclosure are provided. The communication network system 30 includes the UE 10 and the another UE 20. The UE 10 may include a memory 12, a transceiver 13, and a processor 11 coupled to the memory 12, the transceiver 13. The another UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to obtain a representation of a transmit (Tx) power for the user equipment by a network configuration, a pre-configuration to the user equipment, or a pre-store in the user equipment according to a pre-defined rule, wherein the representation of the Tx power for the user equipment provides a division of a range of output power for the user equipment into different granular scales of power information.

In some embodiments, the different granular scales of power information include a large-scale (LS) power information and a small-scale (SS) power information, a quantization step size of the large-scale power information is greater than a quantization step size of the small-scale power information. In some embodiments, the processor 11 is configured to indicate, to another user equipment 20, the Tx power for the user equipment 10 in two separate components using a two-part indication. For example, UE's full power range is divided into two different granular scales, one large-scale (LS) power information with bigger quantization step size and the other one small-scale (SS) power information with smaller quantization step size. a range or exact values of both LS power information and SS power information can be network configured, pre-configured to a UE, or pre-stored in a UE according to a pre-defined rule (e.g., 3GPP specification). For example, if the UE full power is ranging from Pmin=0 to Pmax=100, possible values for division/quantization of the LS power information could be 0, 10, 20, 30, 40, . . . , 90, and possible values for division/quantization of the SS power information could be 1, 2, 3, 4, . . . , 10. As such, any Tx power level within the UE's power range can be represented by a combination of a value from the LS power information and a value from the SS power information, e.g. Tx power level 57=50 (from the LS power information) +7 (from the SS power information).

In some embodiments, a first part of the two-part indication includes the large-scale power information, a second part of the two-part indication includes the small-scale power information, and the two-part indication is delivered using a two-stage sidelink control information (SCI). In some embodiments, a first stage SCI of the two-stage SCI is transmitted in a physical sidelink control channel (PSCCH), a second stage SCI of the two-stage SCI is transmitted in a physical sidelink shared channel (PSSCH), the first part of the two-part indication is encoded as a part of first stage SCI of the two-stage SCI, and the second part of the two-part indication is encoded as a part of second stage SCI of the two-stage SCI.

In some embodiments, the two-part indication is a hybrid indication which uses a demodulation reference signal (DMRS) of a PSCCH or a PSSCH to carry a first part of the two-part indication and a SCI to carry a second part of the two-part indication. In some embodiments, when the first part of the two-part indication is carried by the DMRS, the Tx power for the user equipment 10 is represented as a part of initialization for a DMRS scrambling sequence generation.

In some embodiments, when the second part of the two-part indication is carried by the SCI, the Tx power for the user equipment 10 is provided by a parameter field in a SCI format to be encoded and transmitted in the PSCCH over a single-stage SCI or the two-stage SCI, or the Tx power for the user equipment 10 is provided by a parameter field in a SCI format to be encoded and transmitted in the PSSCH over the two-stage SCI.

In some embodiments, the first part of the two-part indication is used to represent one of the large-scale power information and the small-scale power information, and the second part of the two-part indication is used to represent another of the large-scale power information and the small-scale power information.

In some embodiments, the two-part indication is a hybrid indication, and a first part of the two-part indication and a second part of the two-part indication are time domain multiplexed.

In some embodiments, the first part of the two-part indication is sent periodically via a SCI, a medium access control-control element (MAC-CE), or a radio resource control (RRC) over a sidelink interface.

In some embodiments, the first part of the two-part indication comprises the large-scale power information. In some embodiments, when the first part of the two-part indication is sent via the SCI, the Tx power for the user equipment 10 is represented as a parameter field in a SCI format, and when the first part of the two-part indication is sent via the MAC-CE or the RRC, the Tx power for the user equipment 10 is encoded and transmitted in a PSSCH. In some embodiments, the second part of the two-part indication comprises the small-scale power information. In some embodiments, the second part of the two-part indication is sent periodically or aperiodic as a parameter field in a SCI format.

Figure 2:
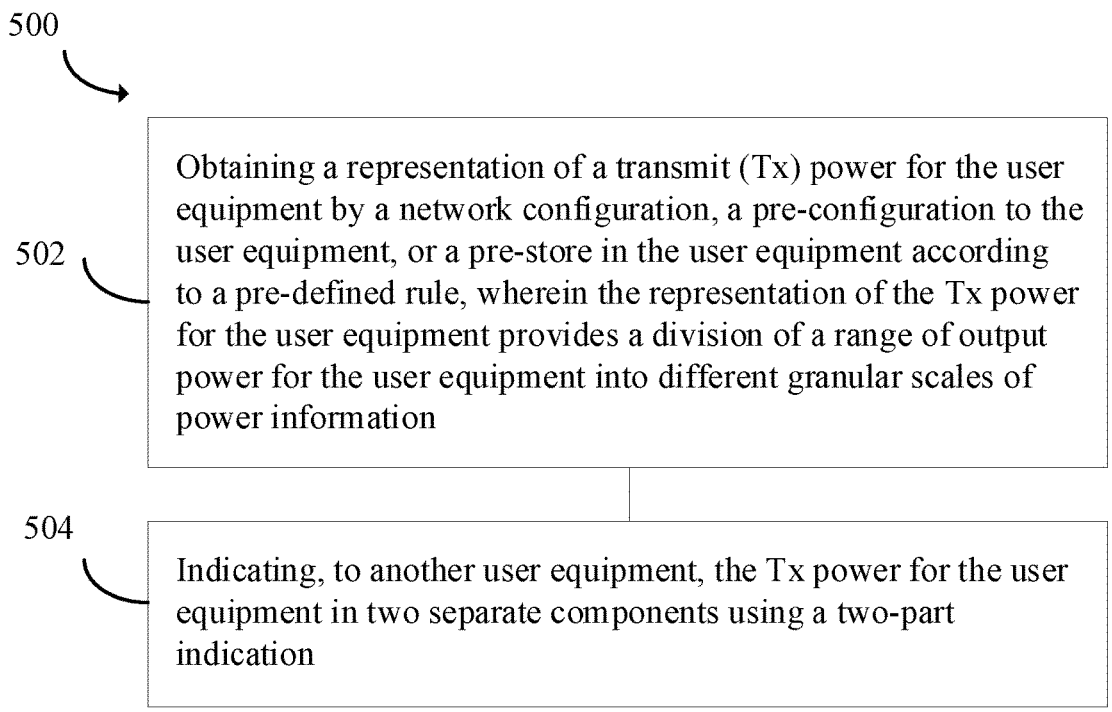
FIG. 2 is a flowchart illustrating a method of wireless communication of a user equipment according to an embodiment of the present disclosure.

FIG. 2 illustrates a method 500 of wireless communication of a UE according to an embodiment of the present disclosure.

In some embodiments, the method 500 includes: a block 502, obtaining a representation of a transmit (Tx) power for the user equipment by a network configuration, a pre-configuration to the user equipment, or a pre-store in the user equipment according to a pre-defined rule, wherein the representation of the Tx power for the user equipment provides a division of a range of output power for the user equipment into different granular scales of power information.

In some embodiments, the method 500 further includes a block 504, indicating, to another user equipment, the Tx power for the user equipment in two separate components using a two-part indication.

In some embodiments, the different granular scales of power information include a large-scale power information and a small-scale power information, a quantization step size of the large-scale power information is greater than a quantization step size of the small-scale power information.

In some embodiments, a first part of the two-part indication includes the large-scale power information, a second part of the two-part indication includes the small-scale power information, and the two-part indication is delivered using a two-stage sidelink control information (SCI).

In some embodiments, a first stage SCI of the two-stage SCI is transmitted in a physical sidelink control channel (PSCCH), a second stage SCI of the two-stage SCI is transmitted in a physical sidelink shared channel (PSSCH), the first part of the two-part indication is encoded as a part of first stage SCI of the two-stage SCI, and the second part of the two-part indication is encoded as a part of second stage SCI of the two-stage SCI.

In some embodiments, the two-part indication is a hybrid indication which uses a demodulation reference signal (DMRS) of a PSCCH or a PSSCH to carry a first part of the two-part indication and a SCI to carry a second part of the two-part indication.

In some embodiments, when the first part of the two-part indication is carried by the DMRS, the Tx power for the user equipment is represented as a part of initialization for a DMRS scrambling sequence generation.

In some embodiments, when the second part of the two-part indication is carried by the SCI, the Tx power for the user equipment is provided by a parameter field in a SCI format to be encoded and transmitted in the PSCCH over a single-stage SCI or the two-stage SCI, or the Tx power for the user equipment is provided by a parameter field in a SCI format to be encoded and transmitted in the PSSCH over the two-stage SCI.

In some embodiments, the first part of the two-part indication is used to represent one of the large-scale power information and the small-scale power information, and the second part of the two-part indication is used to represent another of the large-scale power information and the small-scale power information.

In some embodiments, the two-part indication is a hybrid indication, and a first part of the two-part indication and a second part of the two-part indication are time domain multiplexed.

In some embodiments, the first part of the two-part indication is sent periodically via a SCI, a medium access control-control element (MAC-CE), or a radio resource control (RRC) over a sidelink interface.

In some embodiments, the first part of the two-part indication comprises the large-scale power information.

In some embodiments, when the first part of the two-part indication is sent via the SCI, the Tx power for the user equipment is represented as a parameter field in a SCI format, and when the first part of the two-part indication is sent via the MAC-CE or the RRC, the Tx power for the user equipment is encoded and transmitted in a PSSCH.

In some embodiments, the second part of the two-part indication comprises the small-scale power information. In some embodiments, the second part of the two-part indication is sent periodically or aperiodic as a parameter field in a SCI format.

Figure 3:
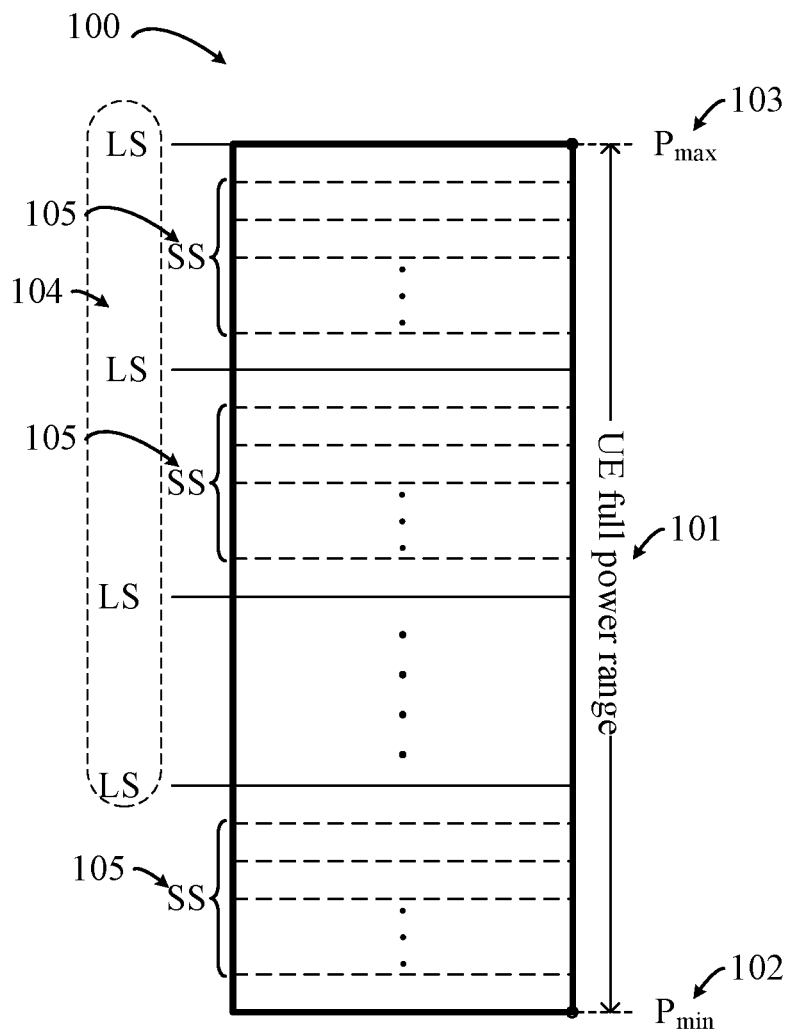
FIG. 3 is a schematic diagram of exemplary illustration of a division of UE full power range into two scales according to an embodiment of the present disclosure.

FIG. 3 is a schematic diagram of exemplary illustration of a division of UE full power range into two scales according to an embodiment of the present disclosure. In some embodiments, methods of representing and indicating a transmit (Tx) user equipment's (UE's) sidelink (SL) transmission power, the representation of Tx power is a division/quantization of UE's full power range into two different granular scales.

The scales of UE transmission power are network configured for in-network coverage operation or pre-configured for out-of-network coverage operation to the UE, for example, a Tx-UE, or pre-defined by a specific rule(s) and stored in the Tx-UE. One or both of these power scales are then indicated directly over the SL interface to receiver UEs in two separate parts to split/offload the overall payload size using different containers without sacrificing any accuracy.

At the receiver UE, it combines the indications from the two parts to obtain/reconstruct the original Tx power used or it can use just one of the two parts to obtain a rough indication of the original Tx power used by the Tx-UE, for the purpose of calculating pathloss and deriving its subsequent Tx powers for transmitting feedback information and data messages.

In some embodiments, granular scaling of UE full power range is provided. In reference to a diagram 100 in FIG. 3, in some embodiments, a conceptual illustration of division/quantization of UE's full power range 101 from a minimum value of Pmin 102 to a maximum value of Pmax 103 is provided. The UE's full power range is divided into two different granular scales, one large-scale (LS) 104 with bigger quantization step size and the other one small-scale (SS) 105 with smaller quantization step size.

In some embodiments, the range or exact values of both LS 104 and SS 105 can be network configured, pre-configured to a UE, or pre-stored in a UE according to a pre-defined rule (e.g., 3GPP specification). For example, if the UE full power is ranging from Pmin=0 (102) to Pmax=100 (103), possible values for the large-scale division/quantization 104 could be 0, 10, 20, 30, 40, . . . , 90, and possible values for the small-scale division/quantization 105 could be 1, 2, 3, 4, . . . , 10. As such, any Tx power level within the UE's full power range 101 can be represented by a combination of a value from the LS 104 and a value from the SS 105, e.g. Tx power level 57=50 (from the large-scale division)+7 (from the small-scale division).

Therefore, at a receiver side, the actual transmission power used by the Tx-UE can be determined in a reverse manner by combining the LS and SS indications. Alternatively, the Rx-UE can use just the LS 104 to get a rough estimate of the Tx power used by the Tx-UE. For some use cases and purposes such as SL resource sensing/selection and deriving necessary Tx power to be used for sending a hybrid automatic repeat request negative-acknowledgement (HARQ-NACK) feedback in connectionless groupcast communication, it is sufficient to use just the rough estimation.

In some embodiments, if the LS 104 and SS 105 division values are network configured or pre-configured, the range or exact values can be common to all UEs operating in the same cell, carrier or resource pool. The number of information bits to represent the LS power is not necessarily the same as the number of bits to represent the SS power. For example, in some scenarios the number of bits for the LS power can be 3 bits but 4 bits for the SS power, when they are separately indicated in sidelink control information (SCI) or using a different mechanism. In other scenarios the number of bits for the LS and SS could be the same, e.g., 4 bits each, to utilize the same parameter field in SCI.

In some embodiments, if the LS and SS division values are pre-defined in 3GPP specification and a fixed number of bits can be used to represent UE's full power range, then the LS could be represented by the first few number of most significant bits (MSB) and the SS could be represented by the remaining number of bits, i.e., remaining number of least significant bits (LSB). For example, assuming if UE's full power range is represented by a total of 7 bits, the LS could be represented by the 3 most significant bits (MSB) and the SS is represented by the remaining 4 least significant bits (LSB).

In some embodiments, two-part indication of Tx power level is provided. In order to reduce the burden of sending the two UE Tx power scales at once and in the same component such as container, e.g. using SCI in one PSCCH, both of the LS and SS of UE Tx power can be sent over separate components such as parts or containers (namely Part 1 and Part 2) in different time instances or at the same time.

In some embodiments, when Part 1 is used to indicate Tx-UE's output power, it can be used to represent the LS power division/quantization as the Part 1 indication is the first information to be decoded by a Rx-UE. As such, the Rx-UE is able to quickly obtain a rough estimate of Tx power used by the transmitter UE. Furthermore, in some scenarios, it may not be possible or necessary for the Rx-UE to receive and decode the Part 2 indication which contains the SS power information. Therefore, it reduces the latency for the Rx-UE to obtain some estimation of transmission output power used by the Tx-UE.

In some embodiments, when Part 2 is used to indicate Tx-UE's output power, it can be used to represent the SS power division/quantization as the indication is a supplementary information to the LS power indication and it could be sent in a different component such as a container and/or at a later time after the Part 1 indication.

In some embodiments, it is not necessary that the LS power information has to be carried by Part 1 indication/container and the SS has to be carried by Part 2 indication/component. It can be the other way around, except for the following described method below, in which Part 1 and Part 2 indications are multiplexed in a time division manner with different time scales. The mechanism for which to deliver the two-part Tx power information can be one of the following 3 methods.

Figure 4:
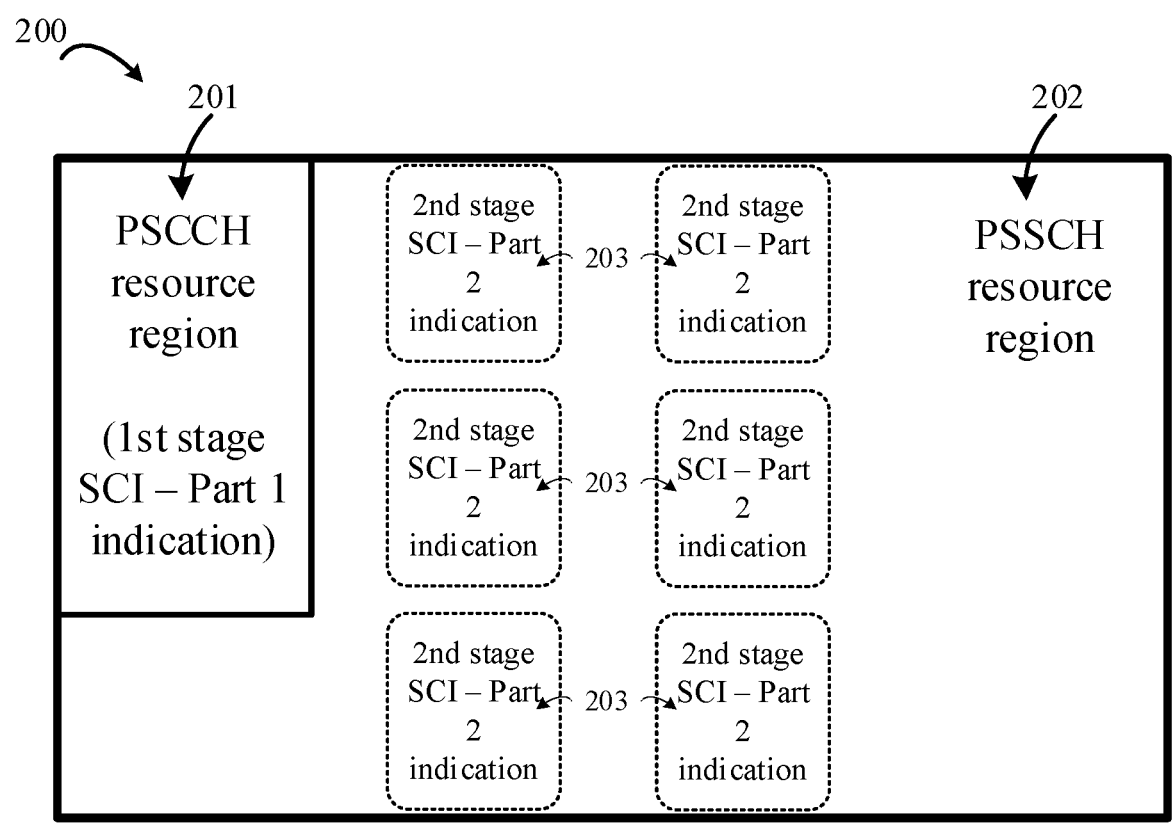
FIG. 4 is a schematic diagram of exemplary illustration of part 1 and part 2 indication of UE transmit power using a two-stage sidelink control information (SCI) according to an embodiment of the present disclosure.

FIG. 4 is a schematic diagram of exemplary illustration of part 1 and part 2 indication of UE transmit power using a two-stage sidelink control information (SCI) according to an embodiment of the present disclosure. In some embodiments, method 1 regarding two-stage SCI method is provided.

In some embodiments, in reference to a diagram 200 in FIG. 4 for the exemplary illustration of delivering Part 1 and Part 2 Tx power indications using a two-stage SCI, where the 1st stage SCI is transmitted in PSCCH resource region 201 and 2nd stage SCI is transmitted in physical sidelink shared channel (PSSCH) resource region 202, the Part 1 indication is encoded as part of 1st stage SCI and Part 2 indication is encoded as part of 2nd stage SCI 203. Therefore, the 1st stage SCI is the component such as the container for Part 1 Tx power indication and the 2nd stage SCI is the component such as the container for Part 2 Tx power indication.

In some embodiments, one purpose of adopting two-stage SCI is to split/offload the total SCI payload into two stages. As such, the 1st stage SCI is intended for broadcast transmissions to be received and decoded by all UEs operating in the same SL resource pool. But the 2nd stage SCI is only intended for Rx-UEs participating in the same SL groupcast or unicast communication.

Therefore, it is not necessary for all Rx-UEs to receive and decode the 2nd stage SCI. Due to this, the LS power information can be delivered in the 1st stage SCI as part of Part 1 indication 201 such that all Rx-UEs can at least obtain a rough estimate of transmission output power used by the Tx-UE. For a Rx-UE that is in the same groupcast or unicast communication with the Tx-UE, it can further receive and decode the 2nd stage SCI to obtain more accurate information on the transmission output power from the Tx-UE.

Figure 5:
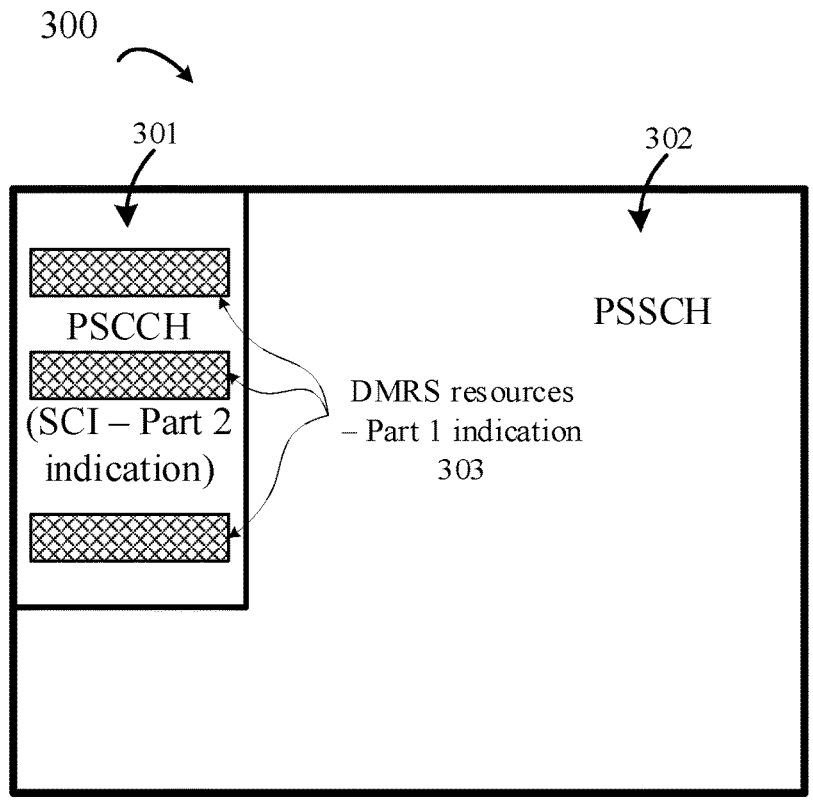
FIG. 5 is a schematic diagram of exemplary illustration of part 1 and part 2 indication of UE transmit power via a demodulation reference signal (DMRS) and a SCI according to an embodiment of the present disclosure.

FIG. 5 is a schematic diagram of exemplary illustration of part 1 and part 2 indication of UE transmit power via a demodulation reference signal (DMRS) and a SCI according to an embodiment of the present disclosure. In some embodiments, method 2 regarding hybrid method between SCI and DMRS is provided. In some embodiments, in a hybrid method, Part 1 and Part 2 indications are sent via DMRS of PSCCH or PSSCH, and SCI, respectively.

The Part 1 indication is carried as part of initialization for the DMRS scrambling sequence generation and it could be used to represent the LS power information, which could be the three most or least significant bits of total bits to represent UE Tx output power.

In some embodiments, the Part 2 indication can be provided as a parameter in SCI to be encoded and sent in PSCCH using a single-stage SCI or two-stage SCI mechanism. Or the Part 2 indication can be provided as a parameter in SCI to be encoded and sent in PSSCH using a two-stage SCI mechanism.

In some embodiments, Part 2 indication can carry the SS power information. But it can be the other way around as well (i.e., Part 2 indication carries LS power information). In reference to diagram 300 in FIG. 5, the Part 1 indication is transmitted using the DMRS resources for PSCCH 303 and the Part 2 indication is carried as part of SCI 301 in PSCCH.

Figure 6:
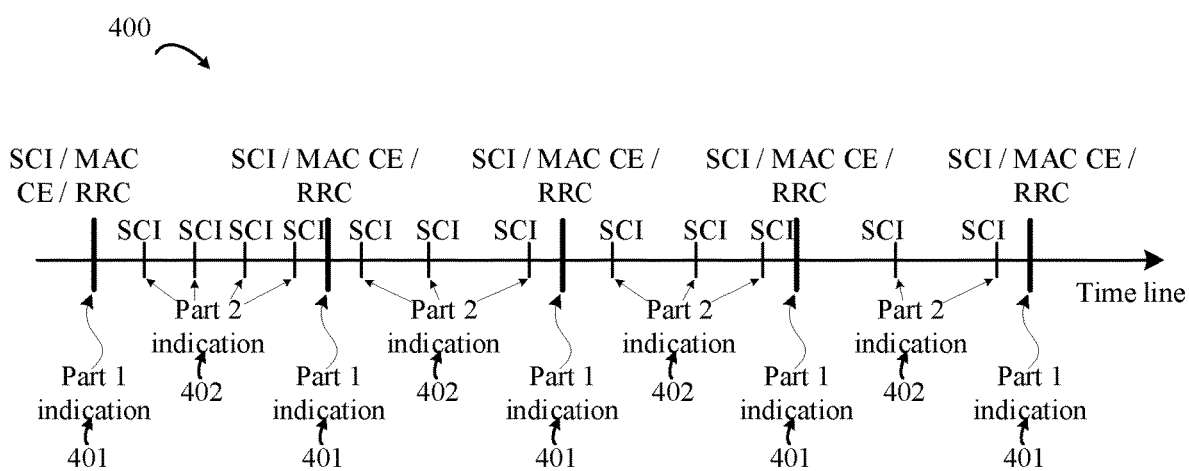
FIG. 6 is a schematic diagram of exemplary illustration of part 1 and part 2 indication of UE transmit power using a SCI only or hybrid between the SCI and higher layer signaling in a time domain multiplexing (TDM) manner according to an embodiment of the present disclosure.

FIG. 6 is a schematic diagram of exemplary illustration of part 1 and part 2 indication of UE transmit power using a SCI only or hybrid between the SCI and higher layer signaling in a time domain multiplexing (TDM) manner according to an embodiment of the present disclosure.

In some embodiments, method 3 regarding time domain multiplexing (TDM) is provided.

In some embodiments, as one of the proposed methods, method 3 can be considered as another hybrid method as Part 1 indication of Tx power can be sent via containers such as SCI, PC5 radio resource control (RRC) or medium access control-control element (MAC-CE) and Part 2 indication is sent by SCI only.

The concept behind this proposed TDM method is that a rough indication of Tx power (LS indication) is sent by the Tx-UE periodically in a large time scale and the SS indications are sent in between them to improve the accuracy of Tx power derivation at the receiver UEs. The main benefit of this method is in its simplicity as long as LS indication timing is known in advanced by all receiver UEs.

As such, this scheme is better suited for SL groupcast and unicast communications. And for most of groupcast and unicast sessions, it is not anticipated that the wireless channel condition for SL communication would change dramatically and rapidly, since multiple UEs participating in the same group are expected to be close to each other and relatively stationary or moving together in the same direction. And therefore, it would be acceptable to the link performance if the LS indication is sent once in a while.

Furthermore, since the two parts are sent at different time and they need to be tracked and combined by Rx-UE(s) at a specific timing and order. Therefore, it is not suitable for broadcast and connectionless groupcast communications, where SL transmission can happen randomly at any time and sometimes packets are transmitted only once.

In some embodiments, in reference to a diagram 400 in FIG. 6 for an exemplary illustration of the proposed TDM method of two-part indication, the Part 1 indications are represented by 401 and they are sent periodically with a larger time scale than the Part 2 indication which is represented by 402. Since the present proposed TDM method 3 in some embodiments is only suitable for SL groupcast and unicast communications with established RRC connections, the Part 1 indication could be delivered via SCI, MAC-CE, or RRC over the PC5 interface. And thus, the Part 1 indication can be used to deliver the LS power information from the Tx-UE and the Part 2 indication is used for the SS power information, which can be sent in every other SL transmission between the Part 1 indications.

In some embodiments, at the receiver UE, once it has received and decoded both parts of Tx power indications, it simply combines/adds the two parts of indications to derive the original Tx power used by the Tx-UE. If the said Rx-UE is only able/need to decode one of the two parts of indications (i.e., the first part which contains the LS indication), it uses the LS indication to obtain a rough estimation of the Tx power used by the Tx-UE.

In some embodiments, when both parts of Tx power indication are received at the Rx-UE, the derivation of the original Tx power can be done by adding the values that each of the two parts represents.

For example, if the received LS indication represents a value of 20 and the SS indication represents a value of 7, then the original Tx power is derived as 20+7=27. If the received LS indication represents x number bits of MSB and the SS indication represents y number of LSB of the Tx power, the derivation can be done by first combining/joining the MSB and LSB into one binary bit string of (x+y) bits and convert the bit string into a numerical value.

In summary, an aspect of some embodiments provides division/quantization of UE full power range into a large-scale and a small-scale information. UE is network configured, pre-configured or stored with pre-defined large-scale and small-scale power information.

Large-scale power information with bigger quantization step size can provide to a receiver UE a rough estimate of Tx power used by the Tx-UE. Small-scale power information with smaller quantization step size can provide to a receiver UE with supplementary information to the LS power and thus be able to give a complete/full information on the Tx power used when combined with the LS indication from the Tx-UE. One or both of these power scales are indicated directly over the SL interface to receiver UEs in two separate parts to split/offload the overall payload size into different containers without sacrificing any accuracy.

At the receiver UE, it combines the indications from the two parts to obtain/reconstruct the original Tx power used or it can use just one of the two parts to obtain a rough indication of the original Tx power used by the Tx-UE, for the purpose of calculating pathloss and deriving its subsequent Tx powers for transmitting feedback information and data messages.

Another aspect of some embodiments provides that UE transmission power is indicated by the Tx-UE in two separate components such as parts or containers using one of three proposed two-part indication method.

In some embodiments, method 1 over the two-stage SCI, Part 1 indication contains LS power information and it is to be carried by the first stage SCI in PSCCH. Part 2 indication contains SS power information and it is to be carried by the second stage SCI in PSSCH. For a receiver UE that only decodes the first stage SCI, it uses the Part 1 indication which contains the LS power information to get a rough indication of the Tx power used by the Tx-UE. For a receiver UE that decodes both the first and second stage SCI it uses indications from both parts and combines the LS and SS power information to get a full information of the Tx power used by the Tx-UE.

This indication method is ideal for allowing broadcast and connectionless groupcast UEs to still be able to obtain at least a rough estimate of Tx power used by the Tx-UE. For a Rx-UE that is participating in the same groupcast and unicast communications, it will be able to obtain the SS power information from the second stage SCI.

In some embodiments, method 2 is a hybrid indication method which uses DMRS of PSCCH or PSSCH to carry Part 1 indication and SCI to carry Part 2 indication. When Part 1 indication is carried by DMRS, the Tx power information is represented as part of initialization for the DMRS scrambling sequence generation.

When Part 2 indication is carried by SCI, the Tx power information is provided by a parameter field in a SCI format to be encoded and transmitted in PSCCH over a single-stage SCI or two-stage SCI mechanism. Or the Part 2 Tx power information can be provided as a parameter field in SCI to be encoded and sent in PSSCH over a two-stage SCI mechanism. Part 1 indication can be used to represent either LS or SS power information. Similar for the Part 2 indication, it can be used to represent either LS or SS power information. There is no strong requirement that it has to be done in a certain way, since both DMRS and SCI needs to be decoded by the Rx-UE.

In some embodiments, method 3 is also a hybrid method, but Part 1 and Part 2 indications are time domain multiplexed (TDM'ed). Part 1 indication is sent periodically via SCI, MAC-CE or RRC over the PC5/sidelink interface from the Tx-UE. Since Part 1 indication is sent only once in a while, it carries only the LS power information. When it is sent via SCI, it is represented as a parameter field in a SCI format. When it is sent via MAC-CE or RRC, the Tx power information is encoded and transmitted in PSSCH. Part 2 indication can be sent periodically or aperiodic as a parameter field in SCI by the Tx-UE, and it carries the SS power information. This method of some embodiments is only suited for SL groupcast and unicast communications among UEs that belong to the same group. A Rx-UE combines both Part 1 and Part 2 indications to obtain the full information of Tx power used by the Tx-UE.

Commercial interests for some embodiments are as follows. 1. Less signaling message exchange will lead to reduced processing, delay, and power consumption. 2. Being able to support more use cases and types SL communications. Hence, this can provide greater use ability and flexibility. 3. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 7:
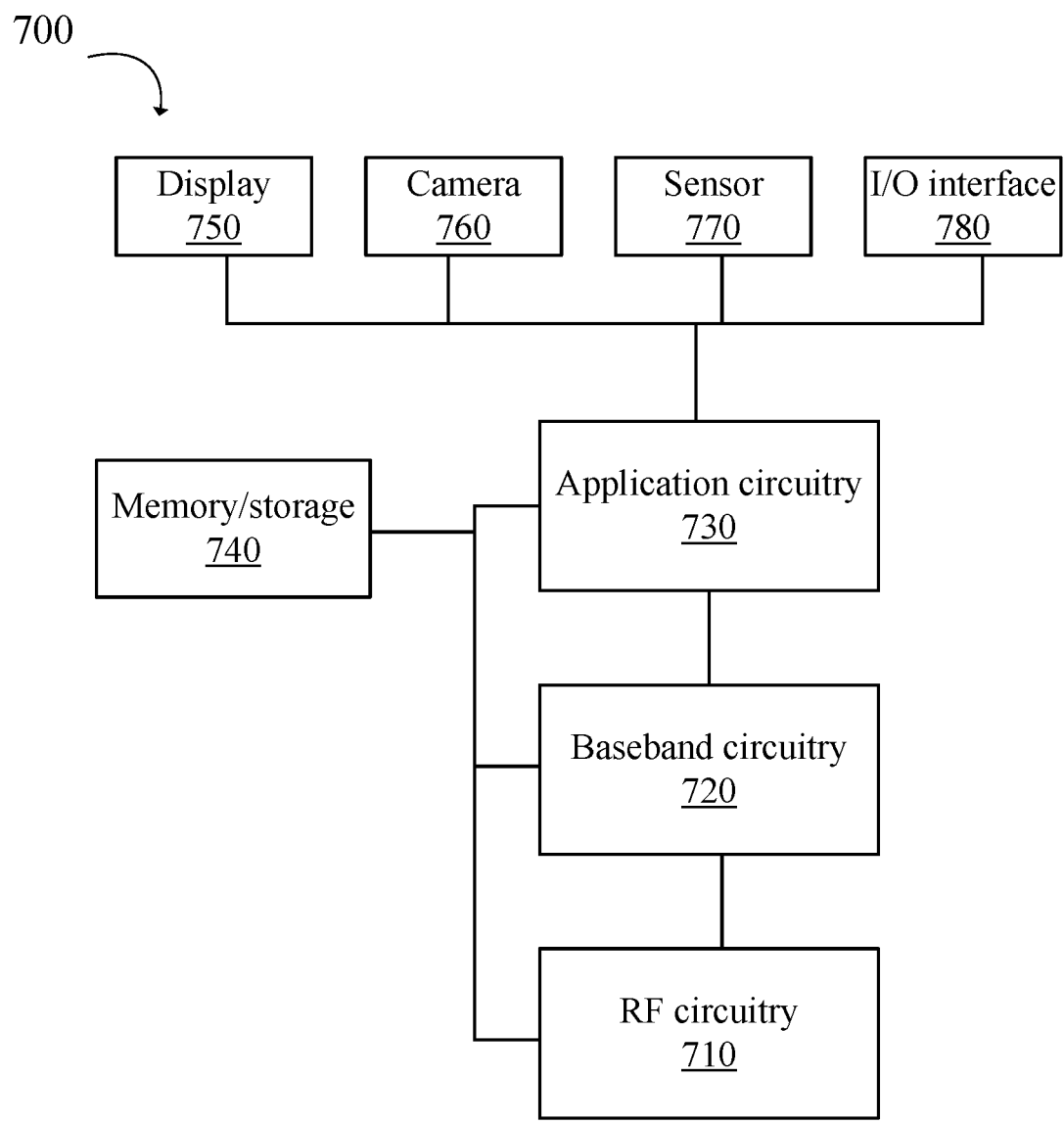
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system.

User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system.

In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc.

In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped.

On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product.

The software product in the computer is stored in a storage medium, including a plurality of commands for a computational device (such as a personal computer, a server, or a network device) to run all or some of the steps disclosed by the embodiments of the present disclosure.

The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for wireless communication, comprising:
    a memory;
    a transceiver; and
    a processor coupled to the memory and the transceiver;
    wherein the processor is configured to:
    obtain a representation of a transmit (Tx) power for the user equipment by a network configuration, a pre-configuration to the user equipment, or a pre-store in the user equipment according to a pre-defined rule, wherein the representation of the Tx power for the user equipment provides a division of a range of output power for the user equipment into different granular scales of power information,
    wherein the different granular scales of power information comprise a large-scale power information and a small-scale power information, a quantization step size of the large-scale power information is greater than a quantization step size of the small-scale power information,
    wherein the processor is configured to indicate, to another user equipment, the Tx power for the user equipment in two separate components using a two-part indication.

2. The user equipment of claim 1, wherein a first part of the two-part indication comprises the large-scale power information, a second part of the two-part indication comprises the small-scale power information, and the two-part indication is delivered using a two-stage sidelink control information (SCI).

3. The user equipment of claim 2, wherein a first stage SCI of the two-stage SCI is transmitted in a physical sidelink control channel (PSCCH), a second stage SCI of the two-stage SCI is transmitted in a physical sidelink shared channel (PSSCH), the first part of the two-part indication is encoded as a part of first stage SCI of the two-stage SCI, and the second part of the two-part indication is encoded as a part of second stage SCI of the two-stage SCI.

4. The user equipment of claim 1, wherein the two-part indication is a hybrid indication which uses a demodulation reference signal (DMRS) of a PSCCH or a PSSCH to carry a first part of the two-part indication and a SCI to carry a second part of the two-part indication.

5. The user equipment of claim 4, wherein when the first part of the two-part indication is carried by the DMRS, the Tx power for the user equipment is represented as a part of initialization for a DMRS scrambling sequence generation.

6. The user equipment of claim 4, wherein when the second part of the two-part indication is carried by the SCI, the Tx power for the user equipment is provided by a parameter field in a SCI format to be encoded and transmitted in the PSCCH over a single-stage SCI or the two-stage SCI, or the Tx power for the user equipment is provided by a parameter field in a SCI format to be encoded and transmitted in the PSSCH over the two-stage SCI.

7. The user equipment of claim 4, wherein the first part of the two-part indication is used to represent one of the large-scale power information and the small-scale power information, and the second part of the two-part indication is used to represent another of the large-scale power information and the small-scale power information.

8. The user equipment of claim 1, wherein the two-part indication is a hybrid indication, and a first part of the two-part indication and a second part of the two-part indication are time domain multiplexed.

9. The user equipment of claim 8, wherein the first part of the two-part indication is sent periodically via a SCI, a medium access control-control element (MAC-CE), or a radio resource control (RRC) over a sidelink interface.

10. The user equipment of claim 9, wherein the first part of the two-part indication comprises the large-scale power information.

11. The user equipment of claim 9, wherein when the first part of the two-part indication is sent via the SCI, the Tx power for the user equipment is represented as a parameter field in a SCI format, and when the first part of the two-part indication is sent via the MAC-CE or the RRC, the Tx power for the user equipment is encoded and transmitted in a PSSCH.

12. The user equipment of claim 8, wherein the second part of the two-part indication comprises the small-scale power information.

13. The user equipment of claim 8, wherein the second part of the two-part indication is sent periodically or aperiodic as a parameter field in a SCI format.

14. A method of wireless communication of a user equipment, comprising:
obtaining a representation of a transmit (Tx) power for the user equipment by a network configuration, a pre-configuration to the user equipment, or a pre-store in the user equipment according to a pre-defined rule, wherein the representation of the Tx power for the user equipment provides a division of a range of output power for the user equipment into different granular scales of power information,
wherein the different granular scales of power information comprise a large-scale power information and a small-scale power information, a quantization step size of the large-scale power information is greater than a quantization step size of the small-scale power information,
wherein the method further comprises indicating, to another user equipment, the Tx power for the user equipment in two separate components using a two-part indication.

15. The method of claim 14, wherein a first part of the two-part indication comprises the large-scale power information, a second part of the two-part indication comprises the small-scale power information, and the two-part indication is delivered using a two-stage sidelink control information (SCI).

16. The method of claim 15, wherein a first stage SCI of the two-stage SCI is transmitted in a physical sidelink control channel (PSCCH), a second stage SCI of the two-stage SCI is transmitted in a physical sidelink shared channel (PSSCH), the first part of the two-part indication is encoded as a part of first stage SCI of the two-stage SCI, and the second part of the two-part indication is encoded as a part of second stage SCI of the two-stage SCI.

* * * * *